Aug. 27, 1957 M. ARTZT 2,804,550

AUTOMATIC LIGHT CONTROL

Filed Aug. 14, 1952

INVENTOR.
Maurice Artzt

BY [signature]

ATTORNEY

United States Patent Office 2,804,550

Patented Aug. 27, 1957

2,804,550

AUTOMATIC LIGHT CONTROL

Maurice Artzt, Princeton, N. J., assignor, by mesne assignments, to the United States of America as represented by the United States Atomic Energy Commission Application August 14, 1952, Serial No. 304,264

5 Claims. (Cl. 250—217)

The present invention relates to a flying spot scanning system which employs a projection kinescope.

More particularly, the invention relates to new and useful means for maintaining substantially constant the light emanating from the flying spot on the face of the kinescope which is used in the facsimile scanning system.

In a system of the instant variety, a kinescope or cathode ray tube is caused to produce a scanning beam of electrons which, by virtue of suitable deflection means such as electrostatic plates or electromagnetic coils, is made to traverse the phosphor screen of the tube at an extremely high rate. As is known to persons skilled in the art, the amount of light which is produced on the luminescent phosphor screen by the electron beam depends, in addition to the intensity of the beam, upon the phosphor-coated surface. More specifically, it is known that, for a given constant beam intensity, the light emerging along any given scanning line will vary because of irregularities in the phosphor coating. Such non-uniform light intensity will therefore produce objectionable effects in the ultimate scanning of the subject of the facsimile scansion. Since the scanning system operates by reflection of the scanning spot by the lighter portions of the scanned subject, the reflected light being caused to impinge upon a photo cell which converts the light values to electrical signals which are then amplified and employed in further circuits, it is necessary for satisfactory results that the light intensity of the scanning beam be maintained substantially constant, so that any light variations picked up by the photo cell will depend primarily on the light and dark portions of the subject matter being scanned.

It is, therefore, a primary object of the present invention to provide means for maintaining the light intensity of the scanning spot of a flying-spot scanning kinescope substantially uniform, regardless of variations in the surface of the phosphor screen of the kinescope.

In addition to the irregularities resulting from the phosphor screen, the amount of light reaching the scanned subject matter is also a function of the position of the projection lens employed in transmitting the flying spot of light from the kinescope to the copy. That is to say, the position of the projection lens with respect to the scanning tube and the copy for any given lens focus will produce certain differences in the amount of light which actually strikes the copy and, as will be appreciated, it is desirable that the amount of light employed in actually scanning the copy be relatively constant regardless of the lens focus.

Another object of the present invention is to provide means for maintaining constant the light intensity of the flying spot striking the copy in a facsimile system as set forth above, independently of the focusing of the projection lens.

A still further aim of the invention is to provide means for maintaining the light intensity of a flying spot scanner constant, which means requires only an addition to the conventional flying spot scanning system, which addition does not necessitate any changes in existing circuits.

In general, the present invention contemplates the control of the intensity of light of the flying spot by means of a pickup or feeler member disposed in such position with respect to the projection lens and mechanically coupled thereto that the amount of light picked up by the feeler member will be proportional to the light striking the projection lens. A suitable circuit is associated with the feeler member for converting the light values picked up by the feeler into electrical signals which are employed ultimately to vary the relative bias between the cathode and grid of the kinescope in such manner that the cathode will be made positive with respect to the grid in response to an increased amount of light emerging from the kinescope, thus decreasing the intensity of the electron beam to reduce the resulting light value to its desired magnitude.

Other objects and advantages of the present invention will become readily apparent to persons skilled in the art from a study of the following detailed description of the drawings in which.

Figures 1, 2, 3:
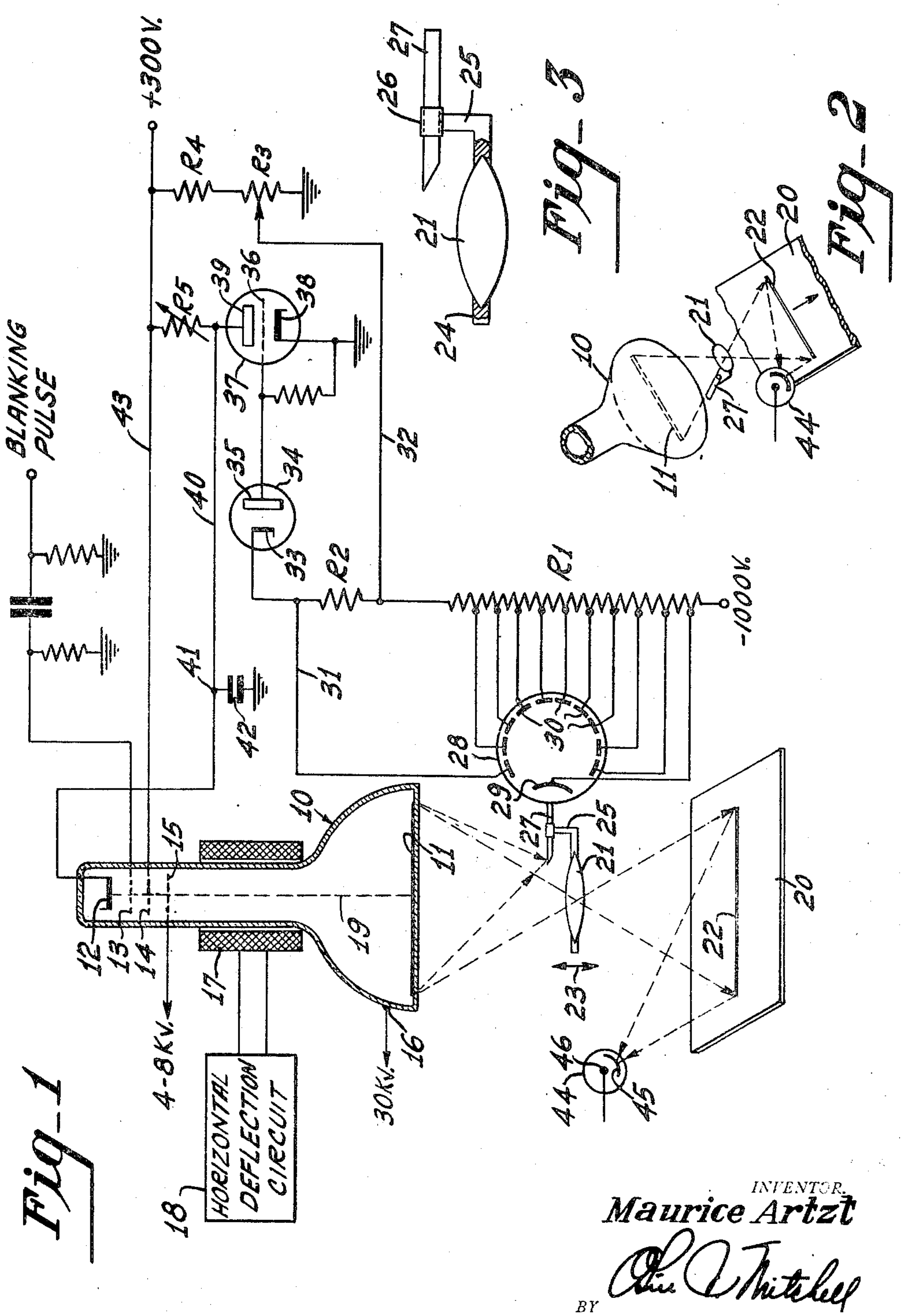
Fig. 1 is a schematic showing of an embodiment of the instant invention.
Fig. 2 is an isometric view of a portion of the invention illustrated by Fig. 1.
Fig. 3 is an enlarged fragmentary view of a portion of the apparatus of Fig. 1.

Referring to the drawings, reference numeral 10 indicates generally a cathode ray tube or kinescope which is provided on the inner surface of its end with a luminescent phosphor coating 11. Kinescope 10 is further provided with a cathode 12, grid 13 and electrode 14. There are shown, additionally, in a conventional manner, a first anode 15 connected to a suitable source of voltage and a second anode connection 16 illustrated as being connected to a source of higher voltage, as is well known to persons skilled in the art.

In a conventional manner, to be described in somewhat greater detail hereinbelow, a beam of electrons is caused to travel from the cathode 12 to a luminescent screen 11, the intensity of such electron beam depending, of course, upon the difference in potential between cathode 12 and the control electrodes of the kinescope.

In order to cause the electron beam to scan or traverse the luminescent screen 11, there is provided a set of horizontal deflection coils 17 through which a sawtooth current is made to flow by means of the horizontal deflection circuit 18 indicated schematically in the drawings. Circuits suitable for the production of such sawtooth current are described in the textbook "Principles of Television Engineering" by Donald G. Fink published by McGraw-Hill Book Company, Inc., 1940, chapter IV. Such deflection circuits do not form a part of the instant invention and are not shown in detail.

By virtue of the deflection circuit 18 and coils 17, however, the electron beam 19 traveling from cathode 12 to screen 11 is made to traverse the screen at a very high rate to scan a subject indicated by reference numeral 20. Such scansion is actually effected by means of a spot of light produced by the bombardment of the phosphor coating by the electron beam 19, as is known in the art. The intensity of the light emanating from the phosphor-coated tube end depends, among other factors, upon the intensity of the electron beam (or the magnitude of the beam current) as well as the character of the phosphor coating. That is to say, with a given electron beam intensity, the amount of light produced along any given scanning line may well vary between successive spots by reason of certain irregularities in the phosphor surface. As stated above, the present invention provides means for compensating for the variations of light intensity which result from such irregularities in the phosphor screen.

In certain conventional facsimile flying spot scanning systems, the vertical "deflection" of the scanning beam is accomplished solely by the travel of the scanned copy with respect to the kinescope. In a scansion system of this type, it is apparent that the variations of light intensity for spots along a given line of phosphor elements is of extreme importance, since there is no opportunity for "averaging" the inequalities as is the case in systems provided with separate vertical deflecting means for the cathode ray beam.

The system illustrated in the drawings employs a projection kinescope, such that a projection lens 21 disposed between the kinescope face 11 and the subject copy 20 serves to project the light rays from the tube onto the copy, thus forming a scanning line on the copy 20 indicated by reference numeral 22. As persons skilled in the art will appreciate, the amount of light which reaches the copy 20 is dependent upon the distance that lens 21 is located from screen 11, since the light values are proportional to the square of such distance. It is desirable that lens 21 be adjustable for focus, for obvious reasons, and therefore it is illustrated as being adjustable by movement along its axis in the direction of arrows 23. The present invention, by virtue of certain fixed relationships with respect to the variably positioned lens 21, insures uniformity in the intensity of the light of the scanning line 22 regardless of variations in the positioning of the lens 21, as will appear more fully.

Fig. 3, which is a detailed view of a portion of the other two figures, illustrates lens 21 and its mounting 24 which may be of any design. Conveniently connected to such mounting 24, for example, by means of an extension 25, is a ring-like holder 26 which supports a light conducting rod 27 which may be fashioned from Lucite or other available material having the light conducting capacity necessary. This Lucite feeler or pickup rod 27 is disposed within the path of a portion of the light which reaches projection lens 21. The amount of light reaching the former will always bear a fixed relationship to the amount of light striking the latter.

As shown more clearly in the isometric view of Fig. 2, the feeler rod is actually disposed in a plane perpendicular to a vertical plane passing through the scanning line on the face of the kinescope 10, thus insuring the fixed relationship between lens 21 and feeler 27 regardless of the spot along the scanning line on the screen 11 from which the light originates.

Associated with the feeler rod 27 in such manner that the feeler will conduct light to it is a photomultiplier tube 28 which may be of any suitable design. In the example, tube 28 comprises a cathode 29 and a plurality of dynodes 30. As is shown in Fig. 1, the cathode 29 is connected to a suitable source indicated as minus 1000 volts and each of the dynodes is tapped to resistor $R_1$ so that a 100 volt potential exists between successive tap connections. In series with resistor $R_1$ is resistor $R_2$. The final dynode of photomultiplier tube 28 is connected by means of lead 31 to the end of resistor $R_2$ more remote from $R_1$, while lead 32 connects the junction point between these two resistors adjustably to a point on resistor $R_3$, the value of which may be, for example, 50 kilohms. As shown, one end of resistor $R_3$ is connected to ground while the other end is connected to a source of 300 volts positive, in series with resistor $R_4$ which may be 1.5 megohms. Resistor $R_2$, at point where it is connected to lead 31 is also connected to the cathode 33 of diode rectifier 34, the plate 35 of this diode being connected to the grid 36 of tube 37. The cathode 38 of the latter tube is grounded, with a one megohm resistor connecting grid 36 to cathode 38. The plate 39 of tube 37 is connected directly to cathode 12 of the kinescope 10 by means of lead 40 which is connected to ground at point 41 through a condenser 42, the function of which will appear below. Plate 39 is also connected to the above-mentioned 300 volt source through resistor $R_5$, which may be of the order of 330 kilohms. As indicated, electrode 14 of the kinescope is also connected to this source of positive voltage by means of connection 43, in a conventional manner.

In operation, a beam of electrons will be caused to travel, by virtue of the voltage drop within the tube 10, from cathode 12 to phosphor screen 11, thus causing a spot of light to emanate from the end of the tube 10. As mentioned above, the spot of light is made to scan the screen 11 linearly by means of a sawtooth current drawn through deflection coils 17 by means of the horizontal deflection circuit 18. Suitable blanking pulses, such as are described in the above cited textbook by Fink, are applied to grid 13 of the kinescope for the purpose of blanking out the electron beam during the interval in which the spot of light retraces from the end of one line to the beginning of the succeeding line. The scanning line thus produced will pass through projection lens 21 and scan copy 20 along line 22. In a manner well known to persons skilled in the art, this scanning line will be selectively reflected by the lighter portions of the copy 20, the reflected light being picked up by photocell 44 having the usual cathode 45 and anode 46, the function of the photocell being to convert the light values thus received into an electrical signal which is further amplified and employed to operate a facsimile receiver (not shown) of a suitable type known in the art.

It should be noted that the maximum electron beam current desired is, before the operation is begun, set by disconnecting diode 34 from its socket and adjusting $R_5$ so that the desired potential difference exists between cathode 12 and grid 14 of the kinescope. Once this has been fixed, its setting need not be changed again during the operation of the system.

In accordance with the present invention, some of the scanning light will be picked up by feeler rod 27 and transmitted to photomultiplier tube 28. Electrons emitted by cathode 29 of the photomultiplier tube will be multiplied by means of the dynodes 30 in such fashion that a current will flow through resistor $R_2$ in such direction that the junction of this resistor with the cathode 33 of diode 34 will be made more negative. It should be noted, at this point, that the adjustable tap of connector 32 on resistor $R_3$ determines the threshold voltage at which the cathode of diode 34 is made sufficiently negative with respect to the plate 35 to permit conducting by the tube. This is so, since resistors $R_4$ and $R_3$ are, by virtue of their respective values, designed to produce a small positive voltage at the point of connection between resistor $R_2$ and wire 32. Assuming that this "threshold voltage" has been set by means of resistor $R_3$ for a value determined by the optimum light intensity of the flying spot, no change in the diode circuit will be produced until the intensity of such light varies from the set value. In the event, for example, that the amount of light picked up by feeler 27 at any given time is greater than the desired value, a greater current will be made to flow through photomultiplier tube 28 and, of course, resistor $R_2$, thus causing a greater voltage drop across this resistor which, in turn, renders the cathode 33 of diode rectifier 34 sufficiently negative as to permit the diode to conduct. With the diode 34 drawing current, grid 36 of triode 37 will be made more negative with respect to cathode 38, thus decreasing the current flow through the triode. Such a decrease in current will, by reason of the decreased voltage drop across resistor $R_5$, render the cathode 12 of the kinescope more positive with respect to electrode 14 which, of course, will reduce the electron beam current in the kinescope a corresponding amount. Capacitor 42 is selected so that it is just sufficient to prevent high-frequency oscillation in the circuit including the kinescope 10, photomultiplier tube 28 and triode 37.

As will be appreciated, the increased amount of light picked up by feeler rod 27 in the above operational example may have been caused either by the phosphor coating itself or by the vertical position of projection lens 21 with respect to kinescope 10, the latter being true since the quantity of the light striking lens 21 will increase as the latter is moved toward the kinescope in proportion to the square of the distance moved. The mechanical coupling between feeler 27 and lens 21, will of course, result in a corresponding increase in the amount of light picked up by the former.

A decrease in the intensity of the light emanating from the kinescope 10 will result in a reverse sequence of operations in the circuit. More particularly, such a decreased amount of light reaching photomultiplier tube 28 will result in a smaller voltage drop across $R_2$, with a corresponding decrease in the current drawn by diode 34. This would render grid 36 of the triode more positive with a correspondingly greater voltage drop across $R_5$, thus resulting in a reduced positive potential on the cathode 12 of kinescope 10.

It should be borne in mind that the various values assigned to the components of the circuit in the above description have been given merely by way of example and, therefore, are not intended to be in any way limiting. Additional minor changes within the scope of the appended claims will also suggest themselves to those skilled in the art from the instant teachings.

Having thus described an embodiment of my invention, what I claim as new and desire to secure by Letters Patent is:

1. A flying-spot scanning system comprising a kinescope having an electrode, a luminescent screen at one end and means for causing a beam of electrons to bombard said screen, thereby producing a spot of light at the end of said tube; means for causing said electron beam to traverse said screen linearly; a photomultiplier tube; means disposed in the path of the light emanating from said tube and adapted to pick up a portion of such light for transmittal to said photomultiplier tube; resistive means in the output circuit of said photomultiplier tube whereby a current flowing in said photomultiplier tube will produce a voltage drop across such resistive means; a first electronic tube, the conducting of which depends upon said voltage drop, and a second electronic tube having a conduction controlling electrode connected to said first electronic tube in such manner that the conduction of said second electronic tube is a function of the conduction of said first electronic tube; means connecting the output circuit of said second electronic tube to the said kinescope's electrode, whereby the voltage level of said output circuit may be made to appear on said electrode; and biasing means for setting the current level in said photomultiplier tube at which said voltage drop across said resistive means will cause said first electronic tube to conduct.

2. A flying spot scanning system as defined by claim 1, wherein said first electronic tube is a rectifier having a cathode and an anode, said cathode being connected to one end of said resistive means and said anode being connected to the input of said second electronic tube.

3. A flying spot scanning system as defined by claim 1, wherein is provided a source of voltage and a voltage-dividing means said resistive means and said voltage-dividing means being so connected to each other that the voltage drop across said resistive means is normally balanced by the voltage from said voltage dividing means, whereby the conduction of said first electronic tube is controlled by said voltage dividing means.

4. A flying spot scanning system as defined by claim 1, including a projection lens, said pickup means being mechanically coupled to said lens.

5. A flying spot scanning system which comprises: a cathode ray tube having a luminescent screen and means for producing and directing a scanning electron beam toward said screen to produce a flying spot of light; lens means for projecting the light emanating from said tube screen onto a subject being scanned; means associated with said tube for controlling the intensity of such beam of electrons thereby to control the intensity of such flying spot of light; means coupled to said lens means for sampling the intensity of light from said tube at said lens means such that the light received by said sampling means varies in intensity as a function of the distance of said lens means from said screen; and light responsive means operatively connected to said beam intensity controlling means for controlling the intensity of such electron beam in response to the intensity of the light received by said light-sampling means.

References Cited in the file of this patent

UNITED STATES PATENTS

| | | |
|---|---|---|
| 2,124,404 | Schroter | July 19, 1938 |
| 2,188,679 | Dovaston et al. | Jan. 30, 1940 |
| 2,415,191 | Rajchman | Feb. 4, 1947 |
| 2,457,456 | Flory | Dec. 28, 1948 |
| 2,480,424 | Simmon | Aug. 30, 1949 |
| 2,556,455 | Szegho et al. | June 12, 1951 |